United States Patent [19]

Gurley

[11] Patent Number: 4,516,150
[45] Date of Patent: May 7, 1985

[54] WORLDWIDE COMPATIBLE SYNCHRONIZING SIGNAL FOR ACCURATE TIME BASE CORRECTION IN AN ANALOG COMPONENT INTERFACE STANDARD

[75] Inventor: Thomas M. Gurley, Moorestown, N.J.

[73] Assignee: RCA Corporation, Princeton, N.J.

[21] Appl. No.: 565,128

[22] Filed: Dec. 23, 1983

Related U.S. Application Data

[63] Continuation-in-part of Ser. No. 509,786, Jun. 30, 1983, abandoned.

[51] Int. Cl.³ .............................................. H04N 9/32
[52] U.S. Cl. ..................................................... 358/13
[58] Field of Search ..................... 358/12, 13, 310, 323

[56] References Cited

U.S. PATENT DOCUMENTS 4,084,181  4/1978  Mita et al. ............................ 358/323

Primary Examiner—Richard Murray
Attorney, Agent, or Firm—E. M. Whitacre; P. J. Rasmussen; Richard G. Coalter

[57] ABSTRACT

A time multiplexed analog component video transmission system transmits a 2.25 MHz or integer multiple thereof reference signal. This choice simplifies a PLL at the receiver, and since it is a multiple of the horizontal frequency for 525 line and 625 line systems, a constant line-to-line phase relationship between horizontal sync and the reference signal is obtained.

14 Claims, 5 Drawing Figures

WORLDWIDE COMPATIBLE SYNCHRONIZING SIGNAL FOR ACCURATE TIME BASE CORRECTION IN AN ANALOG COMPONENT INTERFACE STANDARD

This is a continuation-in-part application of Ser. No. 509,786, filed on June 30, 1983 now abandoned having the same title, inventor and assignee as the present application.

BACKGROUND OF THE INVENTION

The present invention relates to analog component transmission of a color video signal, and more particularly, to a synchronization signal for use therewith.

It has been suggested to transmit a color video signal through a channel, such as a VTR (video tape recorder) or a satellite transmission path, using serially transmitted time compressed analog components. Serial transmission is desirable so that only one channel is needed, thereby minimizing tape consumption, while component signals, such as Y, R-Y, B-Y, rather than a composite signal are used to eliminate crosstalk between the luminance and chrominance signals. A high frequency reference signal is also transmitted every line, for example just after a horizontal sync pulse, to allow recovery and reformatting into a standard composite color signal at the receiver or playback apparatus. This recovery and playback comprises time base correcting (TBC) and time expansion. The time base corrector has a PLL (phase locked loop) that receives the high frequency reference signal and compares it to a frequency related to a VCO (voltage controlled oscillator) frequency, said relationship being a fixed ratio. The output of the VCO is used as a clock for the line store memories and time expander. Also an axis-crossing of the high frequency reference signal is used, following detection of the horizontal sync, to provide greater precision of the line starting time. However, since in general the high frequency reference signal is not an integer multiple of the horizontal frequency, there will be a line-to-line phase change between the leading edge of the horizontal sync and the reference signal. In the presence of noise, this may lead to an ambiguity of the line starting time. Further, since all lines are not identical with respect to the sync-to-reference signal phase relationship, complex circuitry, as shown for example in U.S. Pat. No. 4,024,571, is required in the TBC to maintain this relationship constant in the TBC output signal. Also the PLL circuit will be complex due to said non-integer relationship, which in turn may cause a slow lock-up time and picture jitter.

It is therefore desirable to provide a sync signal that allows simpler circuitry.

SUMMARY OF THE INVENTION

Method and apparatus comprising serially transmitting through a channel time compressed component signals of a color video signal and a reference signal having a frequency of 2.25 MHz or a integer multiple thereof, receiving said signals from said channel, and processing the received component signals using said synchronization signal.

DETAILED DESCRIPTION

Figure 1A:
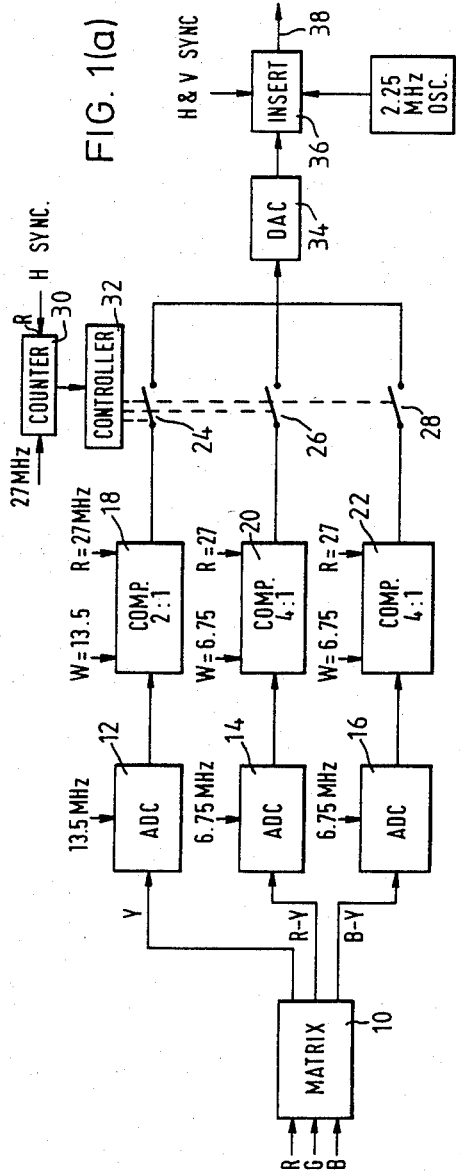
FIGS. 1a and 1b are block diagrams of a transmitter and a receiver, respectively, constructed in accordance with the invention.

FIG. 1a shows a transmitter in accordance with the invention. R (red), G (green), and B (Blue) analog video signals are received from a source, such as a camera, and applied to a matrix 10. The output signals from matrix 10 comprise Y (luminance) and R-Y and B-Y color difference signals and are respectively applied to ADC (analog-to-digital converters) 12, 14 and 16. In accordance with the international digital video standard, the Y signal is digitized at 13.5 MHz, while the R-Y and B-Y signals are digitized at 6.75 MHz, all to 8-bit accuracy. Alternatively, instead of ADCs, samplers could be used to provide sampled analog output signals.

The digital Y, R-Y and B-Y signals are respectively applied to time compressors 18, 20 and 22. As known in the art, each of said compressors can comprise a pair of RAMS (random access memories) with means for switching the input and output signals between the pair. The switching is arranged such that during a first line, a first RAM of said pair is writing in the digital signals, while the second RAM of said pair is reading out signals. During the second line, the first RAM reads, while the second RAM writes. During the third succeeding line the operation is the same as during the first line, etc. If the signals comprise sampled analog signals, then the compressors can comprise CCD (charged coupled device) delay lines as shown in U.S. Pat. No. 4,376,957, and assigned to the assignee of the present invention.

The writing clock frequencies for compressors 18, 20 and 22 are the same as the digitizing frequencies of the input signals, i.e. 13.5 MHz for compressor 18 and 6.75 MHz for compressors 20 and 22. The write clocks occur over the entire active line time. However the read out clock frequencies are higher so that time compression occurs. In particular, the read out clock frequency is 27 MHz for all compressors. Thus compressor 18 provides a 2:1 (27:13.5) time compression. The read clock for compressor 18 is timed to start shortly after the start of the active line period and end about the middle thereof. Compressors 20 and 22 provide a 4:1 (27:6.75) time compression. The read clock for compressor 20 is timed to start shortly after the middle of the active line and end about three quarters into the active period. The read signal for compressor 22 starts slightly after three quarters of said active period and ends near the end thereof.

The signals from compressors 18, 20 and 22 are respectively applied to switches 24, 26, and 28. Counter 30 receives a 27 MHz clock signal at its clock input and a horizontal sync pulse at its reset input (R). The stages of counter 30 are coupled to controller 32. As known in the art, controller 32 comprises decoders (not shown) for decoding the stop and start times for each of the signals, i.e. there are six decoders for the three signals. The outputs of the decoders are applied to the set and reset inputs of three flip-flops (not shown), which flip-flops have outputs respectively coupled to control switches 24, 26, and 28 as indicated by dotted lines. A similar control circuit can be used to control the read signals for compressors 18, 20, and 22. The outputs of said switches are applied to DAC (digital-to-analog converter) 34.

The output of DAC 34 is applied to insertion circuit 36, wherein horizontal, vertical, clamping pedestal, blanking level, and high frequency reference signals are added to the color component signals, all as known in the art. In accordance with the present invention, the reference signal has a frequency of 2.25 MHz or an integer multiple thereof. These frequencies are integer multiples of the line frequencies for both 525 and 625 line systems, which results in circuit simplifications described below.

Figure 2:
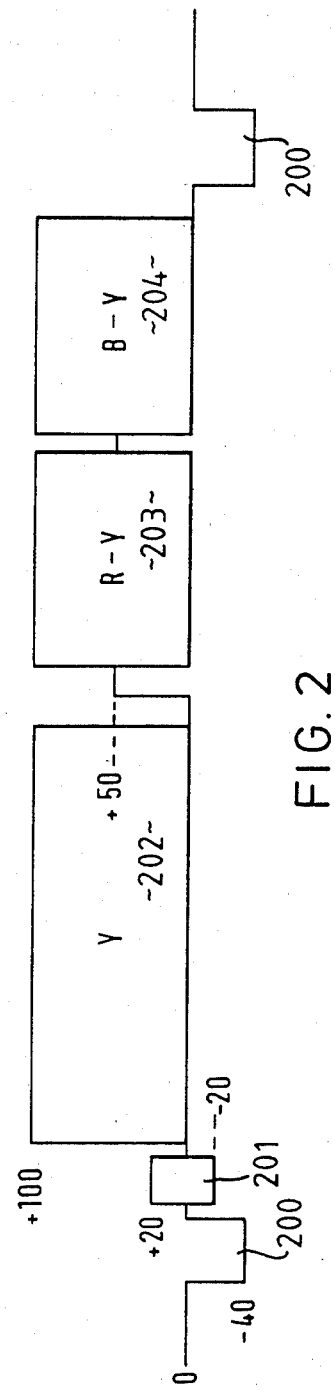
FIG. 2 is a time diagram of a transmitted line.

The output signal of insertion circuit 36 is shown in FIG. 2. A horizontal sync pulse 200 at a level of −40 IRE units is followed by the reference signal 201 having a peak-to-peak excursion of +20 to −20. The Y signal 202 is next. The signal then goes to blanking level (0) and then to a clamping level of +50. Next is the R-Y signal 203, a +50 clamping level, the B-Y signal 204, and finally return to blanking level (0). The Y, R-Y, and B-Y signals have amplitude ranges from 0 to +100 as indicated by the rectangles; in general, the signals are not actually rectangular.

Figure 1B:
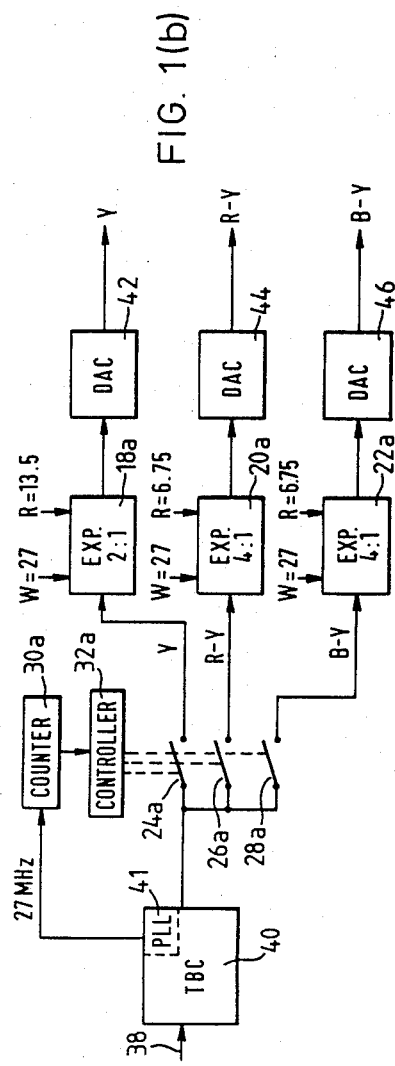

The output signal from insertion circuit 36 is then applied to a transmission path 38, e.g. a VTR, satellite transmission channel, etc., and received by the receiver circuit of FIG. 1b. The transmission path 38 for a VTR includes an FM modulator (not shown) and an FM demodulator (not shown), all as known in the art.

As shown in FIG. 1b, a conventional TBC (time-base-corrector) 40 receives the transmitted signal and internally converts it into a digital signal for processing. Within TBC 40 is PLL 41 that has a VCO (not shown) operating at 27 MHz. This frequency is divided and compared to the received reference signal to produce an error signal for frequency control of the VCO. Since 2.25 MHz and its integer multiplies up to the sixth (except for the fifth—11.25 MHz) divide evenly into 27 MHz, the frequency divider chain in the VCO is simplified, and more gain is therefore present in PLL 41, whereby lock-up time and picture jitter are reduced. Further, since 2.25 MHz and integer multiples thereof are integer multiples of the horizontal sync frequency for both 525-line, 60 Hz and 625-line, 50 Hz systems, the time base corrected output signal from TBC 40 has the same phase of the reference signal with respect to the leading edge of horizontal sync for every line, and therefore no complex phase detecting and correcting circuitry within TBC 40 is required to maintain said relationship constant from line-to-line.

The corrected signal from TBC 40 is derived in digital form therefrom, thereby bypassing the output DACs that are conventionally part of a TBC. The corrected signal is applied to switches 24a, 26a, 28a, while the 27 MHz signal from the TBC is locked to the corrected video signal and applied to counter 30a. The outputs of counter 30a are applied to controller 32a. Counter 30a and controller 32a can have the same construction as counter 30 and controller 32 respectively. Controller 32a controls the positions of switches 24a, 26a and 28a, whose output signals are respectively Y, R-Y, and B-Y, which signals are respectively applied to time expanders 18a, 20a, and 22a. Said expanders can have the same construction as compressors 18, 20, and 22.

The write signal for all of said expanders comprises a 27 MHz signal, which can be derived from the read clock of TBC 40. The read signal for expander 18a is 13.5 MHz to achieve the required 2:1 time expansion, while the read signal for expanders 20a and 22b is 6.75 MHz to achieve the required 4:1 expansion. The signals from said expanders, which now occupy all of the active line time, are respectively applied to DACs 42, 44, and 46 to produce analog Y, R-Y, and B-Y signals respectively. The resulting Y analog signal is then clamped to the blanking level, using the transmitted blanking level signal, while the R-Y and B-Y signals are clamped using the clamping pedestal previously inserted in transmitted signal. This is done by means known in the art (not shown). These signals may now be displayed or further processed, e.g. matrixed to Y, I, and Q or R, G, and B.

Figure 3:
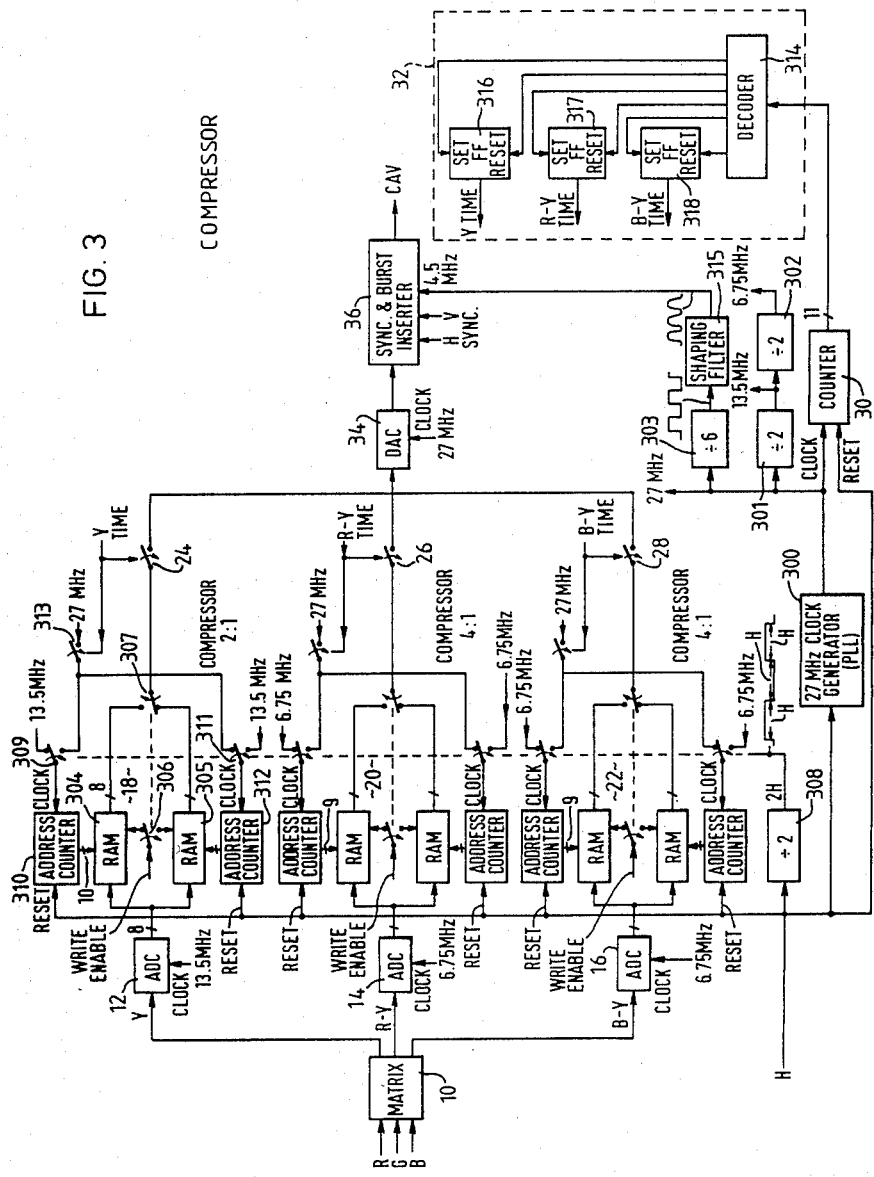
FIGS. 3 and 4 are details of a preferred embodiment of the transmitter and receiver block diagrams of FIGS. 1a and 1b.
Figure 4:
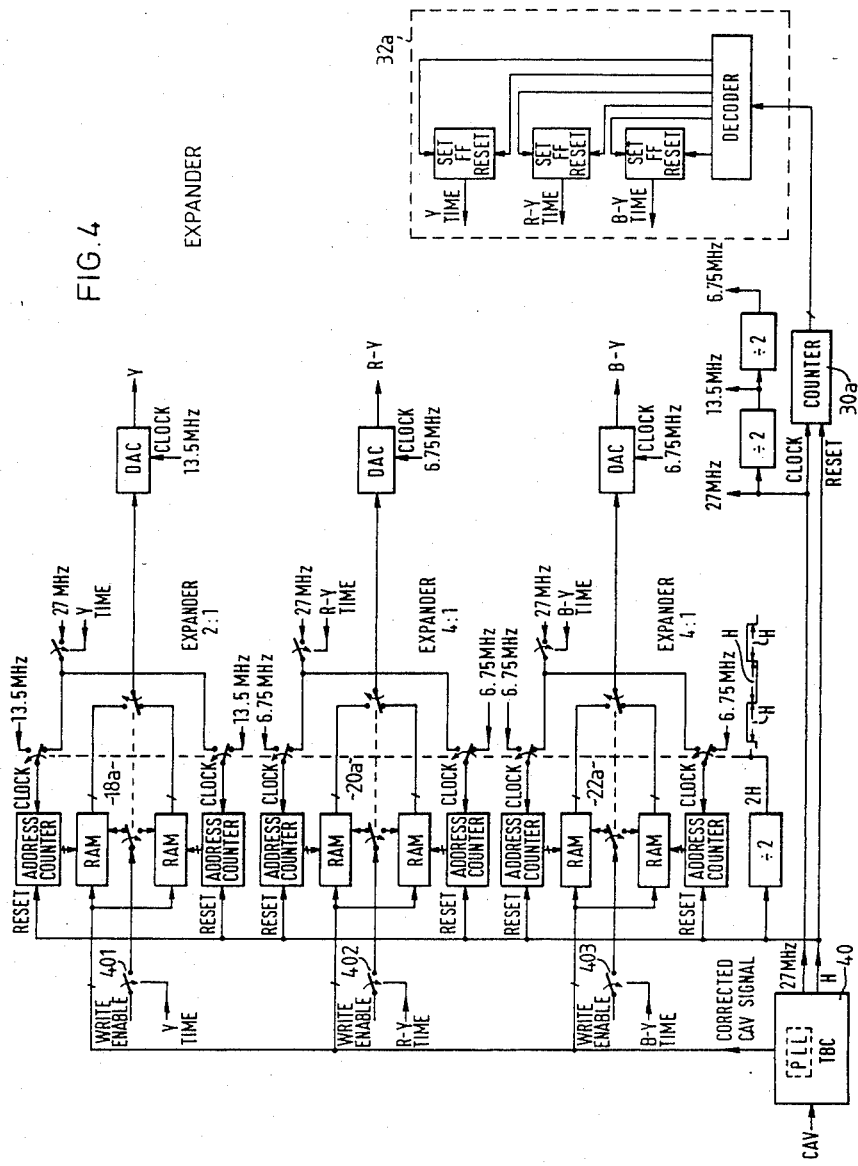

FIGS. 3 and 4 illustrate details of the transmitter and receiver circuits of FIGS. 1a and 1b. Circuits in common with these figures are similarly numbered. In the transmitter of FIG. 3 a 27 MHz clock generator 300 is responsive to horizontal sync signals H for providing at its output clock signals at 27 MHz. Series connected divide-by-two dividers 301 and 302 receive the 27 MHz clock signal and provide the 13.5 MHz clock signal and the 6.75 MHz clock signal, respectively. A divide-by-six divider 303 and series connected shaping filter 315 provide the high frequency reference signal to insertion circuit 36 at a frequency of 4.5 MHz, the second integral multiple of 2.25 MHz. It is noted that a 2.25 MHz signal was used as the reference signal in FIGS. 1a and 1b. ADC's 12, 14, and 16 receive the 13.5 MHz, 6.75 MHz and 6.75 MHz signals, respectively for providing the digitized Y, R-Y and B-Y signals, respectively. As previously noted, each of compressors 18, 20, and 22 comprise a pair of RAMs arranged for writing signal into one of the pair while reading signal out from the other of the pair. More specifically, a write enable signal (e.g., a high logic level signal) is alternately applied to the write enable input of parallel connected RAMs 304 and 305 by a switch 306. A switch 307 is controlled synchronously and 180 degrees out-of-phase with switch 306 for selecting the read out from that RAM of the two which is not currently enabled for writing. Switches 306 and 307 are controlled by a switching signal 2H having a cycle time of two horizontal lines and a high logic level during alternate line periods, which is developed at the output of a divide-by-two divider 308 in response to the horizontal sync signal H (2H signal path illustrated by a dashed line).

A switch 309 couples the 13.5 MHz signal as a clock signal to an address counter 310 for providing address signals to RAM 304 when it is enabled for writing and couples the 27 MHz signal to address counter 310 for providing address signals to RAM 304 when it is reading, thus providing the previously noted 2:1 compression of the Y signal.

A switch 311 is controlled synchronously and in-phase with switch 309 in response to the 2H signal (as indicated by the dashed line) to couple the 27 MHz signal as a clock signal to an address counter 312 for providing address signals to RAM 305 for reading signal out of RAM 305 and couples the 13.5 MHz signal to address counter 312 for providing address signals to RAM 305 for writing signal into RAM 305. Address counters 310 and 312 are each reset by the horizontal sync signal H. A switch 313 selectively applies the 27 MHz signal to switch 309 in response to a Y time signal developed by controller 32.

Controller 32 comprises a decoder 314 responsive to the parallel outputs of counter 30 which counts in response to the 27 MHz clock signal and is reset by the horizontal sync signal H. Decoder 314 comprises an arrangement of logic gates, not shown, for developing three sets of start and stop output signals corresponding to the beginning and end times of the Y, R-Y and B-Y time periods illustrated as 202, 203, and 204, respectively in FIG. 2. The start and stop signals for the Y, R-Y and B-Y signals are applied to the set and reset inputs, respectively of flip-flops 316, 317 and 318 for deriving the respective Y time, R-Y time and B-Y time signals. Each time signal has a duration corresponding to the duration of its respective signal component illustrated in FIG. 2.

The construction and operation of compressors 20 and 22 for the R-Y and B-Y component color signals is substantially the same as the construction and operation of compressor 18 for the Y signal, except that, as previously noted, the write clock signal is 6.75 MHz and the read clock signal is 27 MHz, resulting in a 4:1 compression.

Switches 24, 26 and 28 are controlled by the Y time, R-Y time and B-Y time signals, respectively, for coupling the appropriate time-compressed signals to DAC 34. DAC 34 is responsive to the 27 MHz clock signal and applies its output to insertion circuit 36 wherein horizontal and vertical synchronizing signals H and V (derived from the R, G and B signal source), clamping pedestal, blanking level and the high frequency reference signal, i.e., 4.5 MHz, are added to the component signals for developing the component analog video (CAV) signal.

The receiver circuit of FIG. 4 includes a TBC 40 which, as previously noted, receives the CAV signal and internally converts it to a digital signal for processing. An additional VCO (not shown) internal to TBC 40 generates a 27 MHz clock signal in synchronism with a time-base-corrected CAV signal. The CAV signal is applied simultaneously to expanders 18a, 20a and 22a. Each expander comprises a pair of parallel connected RAMs which operate in a manner substantially similar to the compressors of FIG. 3 but which have a high frequency signal for writing signal into the RAMs and a lower frequency signal for reading signal out from the RAMs, thus causing them to operate as expanders.

The write enable signal, (e.g. a high logic level signal) is selectively coupled to the write enable inputs of the RAMs of expanders 18a, 20a and 22a via switches 401, 402 and 403, respectively, each controllably switched in response to a respective one of the Y time, R-Y time and B-Y time signals developed by controller 32a. This switching of the write enable signal in response to the time duration of each of the various components of the CAV signal provides the function of switches 24a, 26a and 28a of FIG. 1b. The construction and operation of controller 32a, counter 30a and the generation of the 13.5 MHz and 6.75 MHz signals using divide-by-two dividers is substantially the same as described previously in conjunction with FIG. 3.

As previously noted the construction and operation of expanders 18a, 20a and 22a is substantially the same as compressors 18, 20 and 22 of FIG. 3 except that the 13.5 MHz and 6.75 MHz signals are used for reading the luminance and color difference signals respectively from the RAMS and the 27 MHz signal is used for writing these signals into the RAMs for providing the 2:1 expansion for the luminance signal and the 4:1 expansion for the color difference signals.

What is claimed is:

1. A method comprising serially transmitting through a channel time compressed component signals of a color video signal and a reference signal having a frequency of 2.25 MHz or an integer multiple thereof, receiving said signals from said channel, and processing the received component signals using said reference signal.

2. Apparatus comprising transmitting means for serially transmitting through a channel time compressed component signals of a color video signal and a reference signal having a frequency of 2.25 MHz or an integer multiple thereof, receiving means for receiving said signals from said channel, said receiving means including processing means for processing the received component signals using said reference signal.

3. Apparatus as claimed in claim 2, wherein said components comprise Y, R-Y, and B-Y signals.

4. Apparatus as claimed in claim 3, wherein said transmitting means comprises a 2:1 time compressor for said Y signal and two 4:1 time compressors for said B-Y and R-Y signals respectively.

5. Apparatus as claimed in claim 2, wherein said processing means comprises time base correcting means and time expansion means.

6. Apparatus as claimed in claim 5, wherein said component signals are Y, R-Y, and B-Y and said time expansion is 2:1, 4:1, and 4:1, respectively.

7. Apparatus for receiving through a channel serially transmitted time compressed component signals of a color video signal and a reference signal having a frequency of 2.25 MHz or an integer multiple thereof, said receiving apparatus comprising processing means for processing the received component signals using said reference signal.

8. Apparatus as claimed in claim 7, wherein said processing means comprises time base correcting means and time expansion means.

9. Apparatus as claimed in claim 7, wherein said reference signal has a frequency of 4.5 MHz.

10. Apparatus as claimed in claim 2, wherein said reference signal has a frequency of 4.5 MHz.

11. A multiplexed-analog-component television signal transmitter for the sending end of a transmitter-receiver pair which may be used in conjunction with a television system according to a particular lines-per-frame, frames-per second standard, said transmitter comprising:

first and second sources of first and second color television components, respectively;

time-compressing and multiplexing means including an output terminal and also including input terminals coupled to said first and second sources for time-compressing said first and second components for forming time-compressed first and second signal components and for serially coupling said time-compressed first and second component to said output terminal;

pilot signal generating means for generating a pilot carrier at a frequency which is an integer multiple of the frequency established by said lines-per-frame and frames-per-second standard, whereby arbitrary selection of said integer may require the manufacturer of said transmitter to produce different models having different pilot frequencies for use with 525-lines-per-frame, 30-frames-per-second and 625-lines-per-frame, 25 frames-per-second standards, and may then further require said receiver to be in two models for receiving said different pilot frequencies, or alternatively require that the receiver manufacturer design a universal receiver capable of responding to pilot signals of both frequencies; and inserting means coupled to said output terminal of said time-compressing and multiplexing means and to said pilot signal generating means for inserting said pilot signal into the stream of said time-compressed first and second signal components for generating a stream of time-sequential time-compressed components of a color video signal with an inserted pilot carrier;

wherein the improvement lies in that said pilot signal generating means generates said pilot carrier at a frequency of 2.25 MHz whereby said integer is 143 when used with a 525-lines-per-frame, 30-frames-per-second standard and said integer is 144 when used with a 625-lines-per-frame, 25-frames-per-second standard, and therefore only one type of transmitter with respect to serial pilot frequency is required and said counter may count by integer values.

12. Apparatus comprising:

first and second sources of first and second components, respectively, of a color television signal;

time-compressing and multiplexing means including an output terminal and also including input terminals coupled to said first and second sources for time-compressing said first and second components for forming time-compressed first and second signal components and for serially coupling said time-compressed first and second signal components to said output terminal;

pilot signal generating means for producing pilot carrier at a frequency which is an integer multiple of 2.25 MHz, wherein said integer may be one; and inserting means coupled to said output terminal of said time-compressing and multiplexing means and to said pilot signal generating means for inserting said pilot signal into the stream of said time-compressed first and second components for generating a stream of time-sequential time-compressed components of a color video signal with an inserted pilot carrier at 2.25 MHz.

13. Transmitting means, comprising:

a first source of luminance-representative components of a color television signal;

second and third sources of first and second color-difference representative components, respectively, of said color television signal;

first time-compression means coupled to said first source for time-compressing said luminance-representative components by 2:1 to form time-compressed luminance component signals;

second time-compression means coupled to said second and third sources for time-compressing each of said first and second color-difference representative components by 4:1 to form time-compressed first and second color component signals;

control and multiplexing means coupled to said first and second time-compression means for generating a stream of recurrent lines each including in a time sequence said time-compressed luminance component signals and said first and second time-compressed color component signals;

pilot signal generating means for generating pilot signals at a frequency which is an integer multiple of 2.25 MHz; and inserting means coupled to said control and multiplexing means and to said pilot signal generating means for inserting said pilot signals into said stream of recurrent lines for generating a stream of recurrent lines each including said pilot signals and said time sequence of said time-compressed luminance component signals and said first and second time-compressed color component signals.

14. Receiving means adapted for receiving signals including a stream of recurrent lines each including a pilot signal having a frequency which is an integer multiple of 2.25 MHz and a time sequence of luminance-representative signal components time-compressed by 2:1 and first and second color-difference-representative components each of which is time-compressed by 4:1, said receiving means comprising:

phase-lock loop means coupled to receive said pilot signal and including a VCO oscillating at a controlled frequency which is an integer multiple of said frequency of said pilot signal to produce an oscillation, dividing means for dividing said oscillation by an integer to produce a frequency-divided signal, and comparison means for comparing said frequency-divided signal with said pilot signal for generating an error signal for control of said controlled frequency;

controllable demultiplexing and time-expanding means coupled to receive said time sequence of luminance-representative and first and second color-difference-representative components for demultiplexing said components and for time-expanding said luminance-representative signal components by 2:1 and for time-expanding said first and second color-difference-representative components by 4:1, to produce simultaneous time-expanded luminance-representative and first and second color-representative signals.

* * * * *